July 10, 1962 H. ALBINGER, JR 3,043,947
LIGHT DISTRIBUTING LENS SYSTEM
Filed April 8, 1960 2 Sheets-Sheet 1

Inventor:
Harry Albinger Jr.
by Leonard J. Platt
His Attorney

July 10, 1962     H. ALBINGER, JR     3,043,947

LIGHT DISTRIBUTING LENS SYSTEM

Filed April 8, 1960     2 Sheets-Sheet 2

Inventor:
Harry Albinger Jr.
by Leonard J. Platt
His Attorney

United States Patent Office 3,043,947
Patented July 10, 1962

1

3,043,947
LIGHT DISTRIBUTING LENS SYSTEM
Harry Albinger, Jr., Ashland, Mass., assignor to General Electric Company, a corporation of New York
Filed Apr. 8, 1960, Ser. No. 20,951
1 Claim. (Cl. 240—1)

This invention relates to illuminating means for indicating dials.

Since the advent of plastics, there has been developed a procedure of edge lighting such indicating devices as plastic dials with the source of illumination located at the edge of the dial and concealed from direct view. The light from this source is conducted by a series of internal reflections through a light distributing lens and only emerges as visible light when an indented reflecting surface or irregularity such as an engraved mark is encountered in the surface of the lens. In the prior art appreciable difficulty has been experienced in attempting to eliminate the shadow on the dial caused by indicator shafts, etc. passing through the dial and in generally providing a dial with a uniform illuminating means. For these reasons many of the previously used dials have required more than one illuminating source. This invention relates to an improvement in this type of illuminated dial which provides better control of the light distribution over the entire surface of the dial while using only one source of illumination.

It is, therefore, an object of this invention to provide an inexpensive lighting system for an illuminated dial which greatly increases the efficiency and the effectiveness of such dials.

It is a further object of this invention to provide a dial illuminating system with an optical means to provide a desired distribution of light over the entire area of the dial.

According to the invention, an edge-lighted dial having an even light distribution over the entire surface of the dial is provided. This light distribution may be effected by the location of semi-spherical depressions in the surface of the lens which intercept light rays passing through the plane of the lens and reflect them out of the lens to illuminate the dial as desired. These indentations are increased in depth or quantity as the distance from the light source increases or at other places as desired to provide for the desired distribution of the light. These indented reflecting surfaces may be located on the front of the lens so as to reflect most of the light rays to the back of the lens where they may be again reflected by a sheet reflecting or diffusing surface to pass through the lens to be seen by an observer. The edge of the lens may also be beveled so as to reflect any light rays not encountering these indentations, back through the plane of the lens to subsequently be reflected out of the lens by the indented reflecting surfaces.

Where the terms "lens" or "lens plate" are used herein, they are intended to include indicator dials, signs, and similar devices formed of glass, plastic, etc. in which light rays or illumination is conducted to indicia on the lens through which the light is conducted from the illuminating source or on a dial placed in front of the lens.

The subject matter which I regard as my invention is particularly pointed out and distinctly claimed in the concluding portion of this specification. My invention, however, both as to organization and method of operation together with further objects and advantages thereof may best be understood by reference to the following description taken in connection with the accompanying drawings, in which:

FIG. 1 is a detailed view of the combined lens and lamp holder assembly;

2

Figure 1:
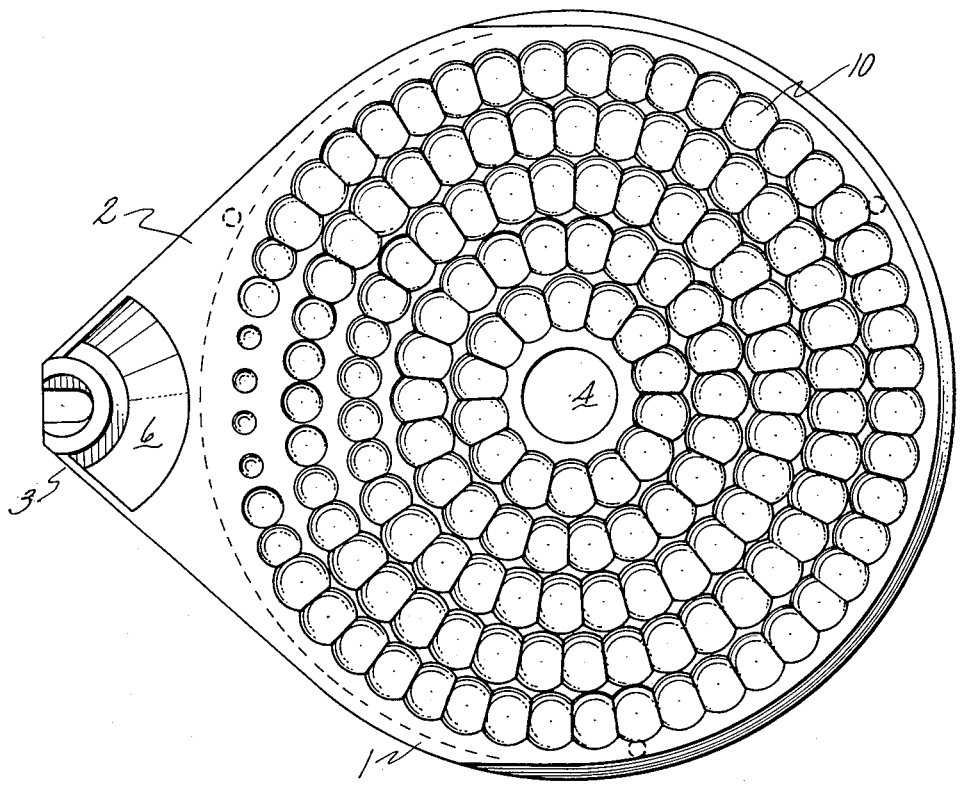

Referring now more particularly to the drawings, FIG. 1 illustrates an embodiment of the invention adapted for the illumination of lens plate 1. The lens plate 1 may be formed of any of the materials normally employed for edge-lighted dials. In the arrangement shown, the lens plate is somewhat circular in shape with a portion 2 extending therefrom and connecting the plate with a light source or lamp holder 3. The lens plate is of uniform thickness in this embodiment and is shown with a hole or opening 4 situated in the center to allow various control means or pointers to protrude therethrough such as would be required in utilizing the subject lens in an electric clock or similar apparatus. Also, mounting studs 5 may be provided for positioning the lens within a supporting structure.

Figure 2:
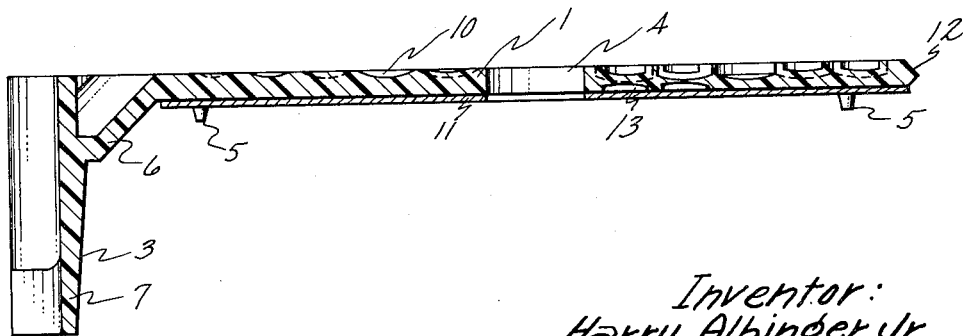
FIG. 2 is a side view, in section, of the combined lens and lamp holder assembly.
Figure 3:
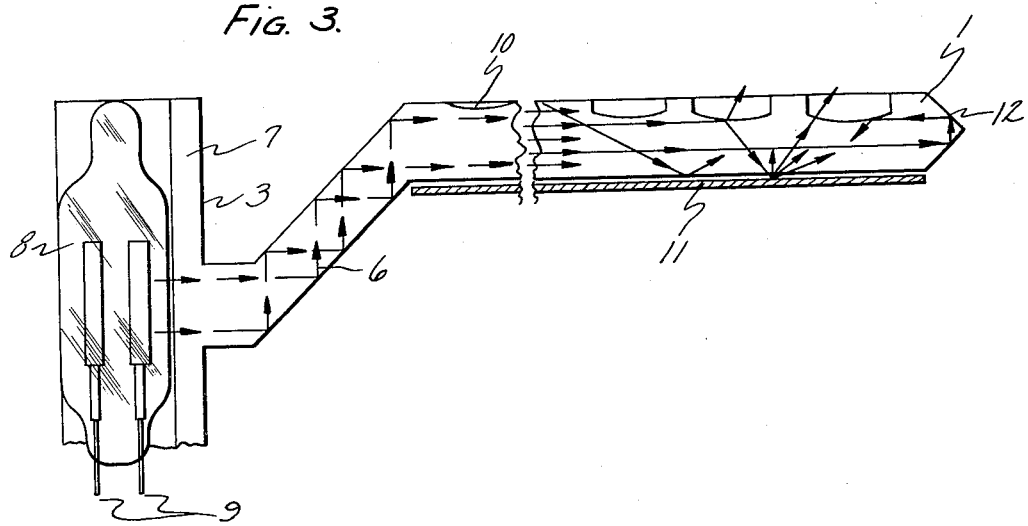
FIG. 3 is an enlarged view, in section, of the lens and lamp holder assembly.

Referring now more particularly to FIGS. 2 and 3, a support member 6 is illustrated, preferably of plastic material, projecting from the edge of the lens plate to the lamp holder 3. In this manner, the lamp holder may be rigidly positioned with respect to the lens plate and the support member 6 serves to conduct light from the holder 3 to the lens plate 1. It should be understood that the lamp holder 3, support member 6, and lens plate 1 may be formed separately and fastened together in a suitable manner; however, the preferred embodiment is shown in the drawings whereby the complete structure is molded or otherwise formed in one integral unit. It should be noted that the particular combination of lens and lamp holder structure illustrated is the invention of Chester B. Marble and myself and is described in the copending application Serial No. 20,953, filed April 8, 1960, and assigned to the present assignee.

The lamp holder 3 may be formed in a clamp or C-shape with member 7 being of a light-conducting material to provide a resilient clamping action so that a lamp 8 may be forced into the clamp member 7 and securely held in position. The lamp 8 may be of the usual miniature electric type with two conductors 9 leading therefrom for connection to a means of electrical energization to illuminate the lamp.

When the lamp 10 is inserted in the proper position within the lamp holder 3 and illuminated, light rays emanate therefrom and are conducted through the lamp holder 7 and into the support member 6 where they are reflected between the surfaces, as indicated by the arrows in FIG. 3, and thereafter into the lens plate 1. A reflecting shield or tape (not shown) may be placed around the lamp holder 3 after the lamp 10 is inserted to help contain the illumination and direct the light into the support member 6.

Located in the front surface of the lens plate 1 are a plurality of semi-spherical depressions 10 which intercept the light as it passes through the lens plate and reflect this light at various angles mostly toward the rear surface of the lens body 1. A reflecting and diffusing surface 11 may be situated adjacent to the rear surface of the lens which again reflects the light rays coming from the spherical depressions 10 back through the front surface of the lens and through a dial plate where it is visible to the observer. This reflector 11 may take the form of any general type of reflecting and diffusing plate situated adjacent to the lens or may be a reflecting film deposited directly on the surface of the lens plate.

It has been found that this configuration of reflector indentations 10 together with the reflecting and diffusing surface 11 is superior because of the particular reflected-light distribution which is provided thereby. Where flat or semi-flat reflector surfaces tend to concentrate the reflected light in parallel beam patterns, these spherical reflector surfaces distribute the light over the entire surface area of the lens plate thereby providing for a uniform light distribution over the entire lens plate surface which is much more desirable than in previously disclosed illuminated dials.

By locating the reflector indentations 10 on the front of lens plate 1 so that much of the light must again be reflected or diffused by the sheet reflector 11 before passing through the lens plate 1 to be visible to an observer, the light is more evenly distributed than by using only the spherical reflecting surfaces 10 to reflect light directly out through the lens plate. However, good results may still be obtained by locating the spherical reflector indentations in the back of the lens plate so that light rays reflected thereby through the front of the lens plate may become visible to an observer without the utilization of the additional reflector 11.

As the light passes through the plane of lens plate 1, naturally some of it is not intercepted by the indented reflector surfaces and reflected out of the lens plate. To prevent this light from emanating from the edge of the lens plate 1 and causing undesirable lighting effects around the edge of the lens, the edges of the lens plate 1 which this light encounters are beveled to form reflector surfaces 12. In this manner, better utilization is made of the light passing into the lens plate 1 since more of the light not encountering the indented reflector surfaces 10 when it first passes through the lens plate is reflected back through the lens by these reflector surfaces 12 where it may again be reflected out of the lens plate by reflectors 10. These reflector surfaces 12 may be of any form for this purpose and because they increase the amount of light which is actually utilized, a smaller illuminating source may be utilized to provide sufficient illumination for a dial.

In order that an equal distribution of light may be provided throughout the desired area of the lens plate while using just one illumination source, the spherical depressions 10 on the side of the lens 1 next to the illuminating source may be formed more shallow than those deeper depressions located at a further distance from the light source. As these light rays travel greater distances through the lens they lose energy to a certain extent, or else certain areas of the lens may be shadowed by controls, etc., extending through the lens plate since the light travels in straight lines. The difference in depth of these depressions assures that each depression will intercept and reflect a substantially equal amount of light energy. It should be understood, however, that a similar result may be obtained by locating the reflectors or reflecting surfaces closer together instead of deeper, or both. Also, it is desirable in some applications to vary the depth of those reflecting indentations 10 which are immediately adjacent to the reflecting edge 12 to be more shallow, as here again, more light might be reflected into this area by the reflecting edge 12.

Also, when the lens plate is utilized in applications where it is desired to bring out through the center opening 4 various controls or pointer means, it has been found advantageous to also locate reflecting depressions 13 on the underside of lens plate 1 to reflect light directly through the front surface of the lens and further raise the level of illumination in that area which is shadowed by the control means situated within the center opening 4.

From the foregoing description, it is apparent that this illuminating system solves many of the problems heretofore associated with the lighting of dials or instruments in that it provides a relatively inexpensive means for securing a desired distribution of light over an entire surface of the lens. While I have illustrated and described a particular embodiment of this invention, modifications thereof will occur to those skilled in the art. I desire it to be understood, therefore, that this invention is not to be limited to the particular arrangement disclosed, and I intend in the appended claim to cover all modifications which do not depart from the spirit and scope of my invention.

What I claim as new and desire to secure by Letters Patent of the United States is:

An illuminating indicator device, comprising, a light transmitting panel member having front and rear face surfaces, a lamp holder integrally formed with said panel member, a centrally located opening extending through the front and rear surfaces of said light transmitting panel member, a lamp positioned in said lamp holder, means for transmitting light rays from the source of light in said lamp to said panel and through said panel in a direction generally parallel to the face surfaces of said panel, an elongated opening extending through said lamp holder, tape means gripping said lamp to accurately hold said lamp adjacent to said means for transmitting light rays from said lamp to said panel, reflector indentations formed in the front face surface of said panel to intercept said light rays emanating from said lamp and reflect them out through the front of said panel, said indentations being extended further into the panel member as the distance from the lamp to said centrally located opening increases, means formed at the outer periphery of said panel for reflecting light from the portion of said panel behind said reflector indentations forwardly to said reflector indentations so that light is reflected by and passes through said reflector indentations, and other reflector indentations formed in the front surface between said centrally located opening and said reflector means formed at the outer periphery of said panel, and reflector indentations formed in the rear face surface of said panel close to said centrally located opening between said centrally located opening and the means formed at the outer periphery of the panel for reflecting light, said reflector indentations formed in the rear face surface being arranged opposite to the reflector indentations formed in the front face surface and arranged for cooperating with each other to intercept light rays emanating from said source and reflect them out through the front of said panel and to provide a uniform level of illumination in that area of the light transmitting panel in the vicinity of the centrally located opening remote from the lamp holder.

References Cited in the file of this patent

UNITED STATES PATENTS

| | | |
|---|---|---|
| 2,259,910 | Rylsky | Oct. 21, 1941 |
| 2,566,026 | Hughes | Aug. 28, 1951 |
| 2,689,948 | Rothman | Sept. 21, 1954 |
| 2,745,946 | Protzmann | May 15, 1956 |
| 2,786,196 | Haynes et al. | Mar. 19, 1957 |
| 2,831,453 | Hardesty | Apr. 22, 1958 |
| 2,907,869 | Hudson et al. | Oct. 6, 1959 |

FOREIGN PATENTS

| | | |
|---|---|---|
| 816,795 | France | May 10, 1937 |
| 664,193 | Great Britain | Jan. 2, 1952 |